(12) United States Patent
Sakurai (10) Patent No.: US 11,782,226 B2
(45) Date of Patent: Oct. 10, 2023

(54) OPTICAL DEVICE, METHOD OF MANUFACTURING OPTICAL DEVICE, AND METHOD OF MANUFACTURING OPTICAL DEVICE CHIP

(71) Applicant: santec Holdings Corporation, Aichi (JP)

(72) Inventor: Yasuki Sakurai, Aichi (JP)

(73) Assignee: santec Holdings Corporation, Aichi (JP)

( * ) Notice: Subject to any disclaimer, the term of this patent is extended or adjusted under 35 U.S.C. 154(b) by 0 days.

(21) Appl. No.: 17/723,463

(22) Filed: Apr. 19, 2022

(65) Prior Publication Data

US 2022/0390690 A1  Dec. 8, 2022

(30) Foreign Application Priority Data

Jun. 2, 2021  (JP) .................................. 2021-093288

(51) Int. Cl.
*G02B 6/42* (2006.01)
(52) U.S. Cl.
CPC ................... *G02B 6/425* (2013.01)
(58) Field of Classification Search
None
See application file for complete search history.

(56) References Cited

U.S. PATENT DOCUMENTS

| | | | | |
|---|---|---|---|---|
| 6,328,482 B1 * | 12/2001 | Jian | .................. | G02B 6/423 385/33 |
| 8,744,223 B2 * | 6/2014 | Yamashita | ............ | G02B 6/425 385/33 |
| 2003/0165026 A1 * | 9/2003 | Meyers | .................. | G02B 6/352 359/873 |

FOREIGN PATENT DOCUMENTS

| JP | 2018036635 A | * | 3/2018 |
|---|---|---|---|
| WO | 2005124415 A1 | | 12/2005 |

OTHER PUBLICATIONS

Translation of JP2018036635 (Year: 2018).*

* cited by examiner

*Primary Examiner* — Chad H Smith
(74) *Attorney, Agent, or Firm* — Osha Bergman Watanabe & Burton LLP (57) ABSTRACT

An optical device includes a fiber array that has input optical fibers, a lens array that has lenses, a photodiode array that photodiodes, a first spacer disposed between the fiber array and the lens array, and a second spacer disposed between the lens array and the photodiode array. Each of the lenses collimates input light from a corresponding input optical fiber, from among the input optical fibers. Each of the photodiodes receives the input light collimated by a corresponding lens, from among the lenses, and outputs an electrical signal according to a power of the received input light. The first spacer transmits the input light from each of the input optical fibers to a corresponding lens from among the lenses. The fiber array, the first spacer, the lens array, the second spacer, and the photodiode array are laminated.

9 Claims, 5 Drawing Sheets

OPTICAL DEVICE, METHOD OF MANUFACTURING OPTICAL DEVICE, AND METHOD OF MANUFACTURING OPTICAL DEVICE CHIP

TECHNICAL FIELD

The present disclosure relates to an optical device.

BACKGROUND

Optical power monitors used in optical communication networks are already known (for example, see Patent Literature 1). An optical power monitor is incorporated in, for example, an optical communication device, and it measures the power of an optical communication signal and provides information on the measured power to a controller within the optical communication device.

One example of an optical communication network includes a WDM (optical wavelength-division multiplexing) network. A ROADM is an example of an optical communication device that is disposed at a branched point in the WDM network. The ROADM is provided with an optical switch for switching an optical communication signal to any path and/or for branching/inserting an optical communication signal.

An optical power monitor is mounted on the ROADM, for example, and it is used for controlling an optical amplifier within the ROADM and transmitting an optical communication signal at optimum power. In addition, the optical power monitor is used for controlling and/or monitoring the power of optical communication signals in an optical communication device such as an optical transceiver, optical transponder, or the like that sends/receives optical communication signals.

CITATION LIST

Patent Literature

[Patent Literature 1] International Publication No. WO 2005/124415

SUMMARY

An optical communication device such as that described above has a high need for multi-channelization and miniaturization, and optical power monitors used in conjunction therewith also have a high need for multi-channelization and miniaturization.

However, conventionally, a method has been adopted for the multi-channelization of optical power monitors, wherein a plurality of single channel optical power monitors is prepared, and the plurality of optical power monitors is stored and bundled in a single casing.

In this conventional method, each single channel optical power monitor has a casing, and furthermore, because the casings have a circular cross-section, there is a lot of spatial waste when configuring a multi-channel optical power monitor by bundling these.

Moreover, in the conventional method, a large number of optical power monitors must be manufactured according to the number of channels, and it has not been possible to simplify the manufacturing process due to multi-channelization. In other words, in the conventional method, individual component assembly as well as position adjustment and optical alignment between components associated therewith are required for each single channel optical power monitor.

Therefore, one or more embodiments of the present invention provide an optical device having improved miniaturization and productivity.

An optical device according to one or more embodiments of the present invention is provided with a fiber array, a first spacer, a lens array, a second spacer, and a photodiode array, and is configured having the fiber array, the first spacer, the lens array, the second spacer, and the photodiode array laminated.

The fiber array is provided with a plurality of an input optical fiber. The lens array is provided with a plurality of a lens. Each of the plurality of lenses is disposed so as to collimate input light from a corresponding input optical fiber from among the plurality of input optical fibers.

The photodiode array is provided with a plurality of a photodiode. Each of the plurality of photodiodes is disposed so as to receive input light collimated by a corresponding lens from among the plurality of lenses and output an electrical signal according to the power of the received input light.

The first spacer is provided between the fiber array and the lens array. The first spacer is configured so as to transmit input light from each of the plurality of input optical fibers to a corresponding lens from among the plurality of lenses.

The second spacer is provided between the lens array and the photodiode array. The second spacer is configured so as to transmit input light passing through each of the plurality of lenses to a corresponding photodiode from among the plurality of photodiodes.

According to one or more embodiments of the present invention, the optical device may be manufactured by lamination of an array. Consequently, it is possible to provide an optical device having improved miniaturization and productivity a compared with the background art, wherein single channel power monitors are bundled to configure a multi-channel power monitor.

According to one or more embodiments of the present invention, the fiber array may be further provided with a plurality of an output optical fiber. In this case, the fiber array may be configured having a plurality of a fiber pair arrayed. Each of the plurality of fiber pairs may be configured as a pair consisting of one from among the plurality of input optical fibers and one from among the plurality of output optical fibers.

When the fiber array having the plurality of fiber pairs arrayed is used, the optical device may be further provided with a light branching layer. The light branching layer may be provided between the fiber array and the photodiode array.

The light branching layer may be configured so as to branch the input light from each of the plurality of input optical fibers into a first branched light propagating toward a corresponding output optical fiber from among the plurality of output optical fibers and a second branched light propagating toward a corresponding photodiode from among the plurality of photodiodes. An optical device having a tap function is useful in communication control applications in an optical communication network.

According to one or more embodiments of the present invention, the optical device may be further provided with an aperture plate. The aperture plate may be provided between the light branching layer and the photodiode array. The aperture plate may have an aperture portion for every fiber pair.

The aperture portion may be configured so as to suppress returning light from a corresponding output optical fiber from propagating to a corresponding photodiode, and in turn, to transmit the input light from a corresponding input optical fiber to the corresponding photodiode. By suppressing the photodiode from receiving the returning light, it is possible to improve the measurement accuracy of the power of the input light in the optical device.

According to one or more embodiments of the present invention, the first spacer may be provided with, for every input optical fiber, a light transmitting portion for transmitting the input light from a corresponding input optical fiber to the corresponding lens. The first spacer may be provided with, for every input optical fiber and around the light transmitting portion in the first spacer, a non-transmitting portion for suppressing the input light from the corresponding input optical fiber from propagating to a remaining lens other than the corresponding lens from among the plurality of lenses.

According to one or more embodiments of the present invention, the second spacer may be provided with, for every lens, a light transmitting portion for transmitting the input light permeating through a corresponding lens to a corresponding photodiode. The second spacer may be provided with, for every lens and around the light transmitting portion in the second spacer, a non-transmitting portion for suppressing the input light permeating through the corresponding lens from propagating to a remaining photodiode other than the corresponding photodiode from among the plurality of photodiodes.

This optical device makes it possible to suppress input light from each channel from mixing together with input light from a separate channel, and it is possible to measure the power of the input light from each channel with high accuracy.

According to one or more embodiments of the present invention, in a direction orthogonal to a lamination direction, a laminated structure may be provided with a separate area that does not overlap with another channel for every channel. The plurality of input optical fibers, the plurality of lenses, and the plurality of photodiodes may be one-dimensionally or two-dimensionally arrayed in a direction orthogonal to the lamination direction so that, for every channel, a set of a corresponding input optical fiber, lens, and photodiode is lined up in the lamination direction in the area of the corresponding channel.

According to this kind of optical device structure, by cutting the optical device in the lamination direction and fragmenting, it is possible to manufacture an optical device chip whose number of channels depends on the cutting position.

According to one or more embodiments of the present invention, a method of manufacturing an optical device chip may be provided. That is, a method of manufacturing an optical device chip may be provided, the method including preparing the optical device described above, and cutting the optical device in the lamination direction and fragmenting it to manufacture an optical device chip having fewer channels than the optical device.

According to one or more embodiments of the present invention, a method of manufacturing an optical device chip may be provided, the method including preparing a plurality of components for lamination, including the fiber array, the first spacer, the lens array, the second spacer, and the photodiode array constituting the optical device, and laminating the plurality of components for lamination, fragmenting it, and cutting the optical device in the lamination direction to manufacture an optical device chip that is equivalent to a fragment of the produced optical device, the optical device chip having fewer channels than the optical device, and wherein, at a stage where the plurality of components for lamination is at least partially laminated, the plurality of components for lamination is cut in the lamination direction and fragmented, and a fragment of the plurality of components for lamination is used to manufacture the optical device chip.

According to one or more embodiments of the present invention, cutting may be performed using a femtosecond laser. When a femtosecond laser is used, the cutting margin when the optical device is cut is small. This means that the disposal interval of the elements in each array may be shortened, and it also means that it is possible to manufacture an array of optical power monitors having elements arranged at high density.

According to one or more embodiments of the present invention, a method of manufacturing an optical device may be provided, the method including preparing a plurality of components for lamination, including the fiber array, the first spacer, the lens array, the second spacer, and the photodiode array constituting the optical device, wherein the plurality of components for lamination is prepared having at least a portion of the plurality of components for lamination provided with a mark for positioning, and the plurality of components for lamination are laminated while positioning the mark as a reference to manufacture the optical device.

Configuring a laminated optical device by positioning using the mark makes it possible to manufacture a multi-channel optical power monitor with high accuracy by a comparatively simple positioning operation.

DETAILED DESCRIPTION

Embodiments of the present invention will be described below with reference to drawings.

Figure 1:
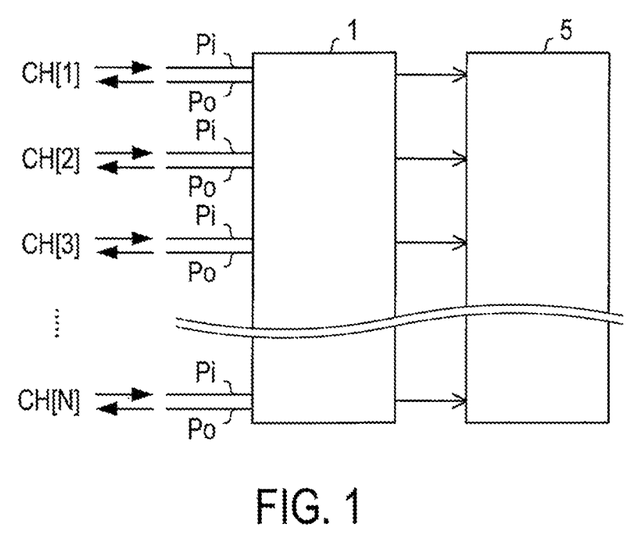
FIG. 1 is a block diagram showing a schematic configuration of an optical device.

An optical device 1 of one or more embodiments illustrated in FIG. 1 is a multi-channel optical power monitor including a tap function which is installed in an optical communication network. This optical device 1 is provided with an input port Pi and an output port Po for each of a plurality of channels CH[1], CH[2], CH[3], . . . , CH[N].

The optical device 1 branches input light from the input port Pi into a first branched light and a second branched light, transmits the first branched light to the output port Po of a channel corresponding to the input port Pi, and measures the power of the input light using the second branched light. This measurement signal is input to a controller 5 that governs communication control in, for example, an optical communication network.

Figure 2:
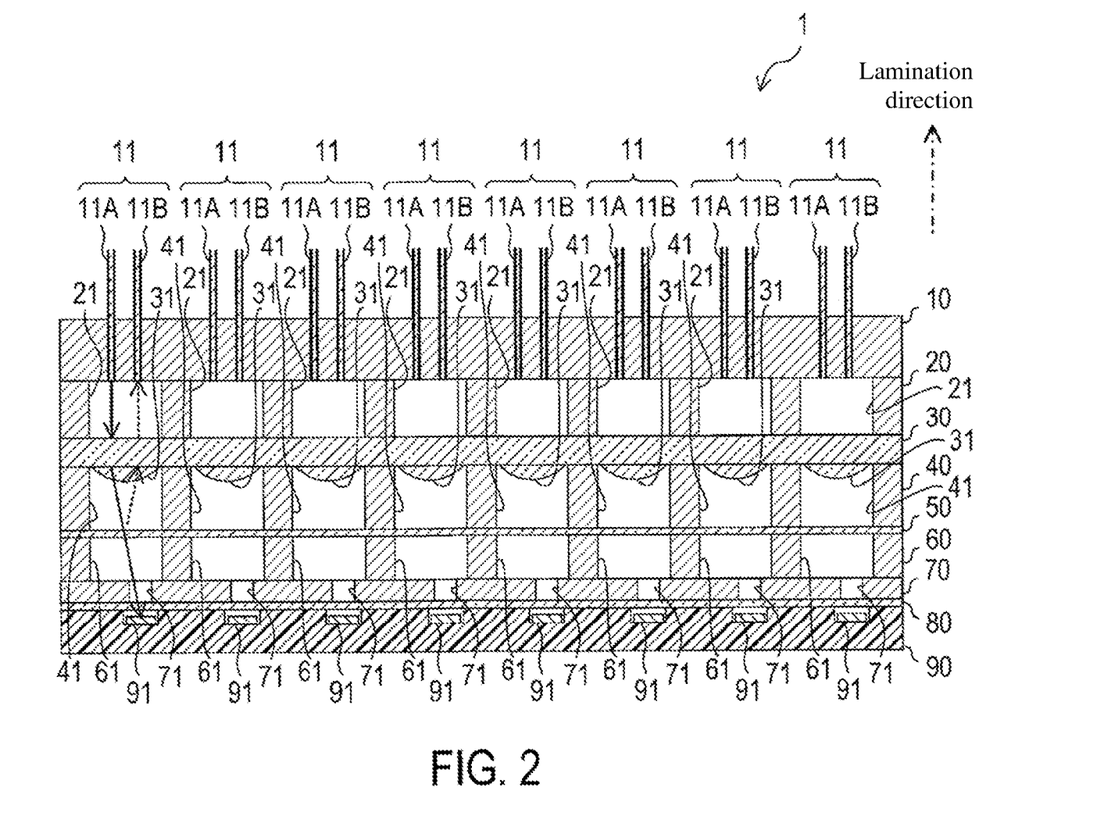
FIG. 2 is a schematic cross-sectional view of the optical device along a lamination direction of the optical device.

As illustrated in FIG. 2, the optical device 1 is provided with a fiber array 10, a first spacer 20, a microlens array 30, a second spacer 40, an optical branching plate 50, a third spacer 60, an aperture plate 70, a lid 80, and a PD ceramic package 90, and is configured as a laminated body of these.

The fiber array 10 is configured to be equivalent to an array of a double-core fiber pigtail, and is configured having a plurality of a fiber pair 11 penetrating into a fiber support plate which is opaque with respect to input light and arrayed one-dimensionally or two-dimensionally in a direction orthogonal to a lamination direction of the optical device 1.

Below, the term "opaque" means "opaque" with respect to the input light of each channel. Similarly, the term "transparent" means "transparent" with respect to the input light of each channel.

The fiber array 10 is provided with a pair constituted of an input optical fiber 11A and an output optical fiber 11B for every channel. The input optical fiber 11A corresponds to the input port Pi, and the output optical fiber 11B corresponds to the output port Po. The fiber pair 11 is a pair constituted of the input optical fiber 11A and the output optical fiber 11B.

The first spacer 20 is disposed under the fiber array 10 and adjacent to the fiber array 10. The first spacer 20 is provided for holding the fiber array 10 of an upper layer and a microlens array 30 of a lower layer at a predetermined interval in the lamination direction.

The first spacer 20 is configured so that a through hole 21 of every channel is formed in an opaque plate such as, for example, a metal plate so that the input light of each channel from the fiber array 10 is not mixed together with the light of a separate channel.

Specifically, the first spacer 20 is configured to be arrayed in the same manner as the fiber pair 11 in the fiber array 10, and a plurality of through holes 21 is arrayed one-dimensionally or two-dimensionally in a direction orthogonal to the lamination direction.

An internal space of each through hole 21 functions as a light transmitting portion for transmitting the input light of the corresponding channel to the lower layer. An inner wall of each through hole 21 enclosing the surrounding and defining the internal space functions as a non-transmitting portion for preventing light propagating through the internal space of the through hole 21 from propagating to an adjacent channel.

The microlens array 30 is disposed under the first spacer 20 and adjacent to the first spacer 20. The microlens array 30 is provided with a microlens 31 for every channel. Specifically, the microlens array 30 is configured to be arrayed in the same manner as the through hole 21 in the first spacer 20, and a plurality of microlenses 31 is arrayed one-dimensionally or two-dimensionally in a direction orthogonal to the lamination direction.

Each microlens 31 is disposed so as to collimate input light from the input optical fiber 11A of a corresponding channel. Input light from the input optical fiber 11A of a corresponding channel selectively arrives at each microlens 31 through the through hole 21 of the corresponding channel. The inner wall of the through hole 21, which functions as a non-transmitting portion, suppresses input light of a channel other than the corresponding channel from arriving at each microlens 31. The light collimated by each microlens 31 is propagated to the lower layer.

The second spacer 40 is disposed under the microlens array 30 and adjacent to the microlens array 30. The second spacer 40 is provided for holding the microlens array 30 of the upper layer and the optical branching plate 50 of the lower layer at a predetermined interval in the lamination direction.

The second spacer 40 is configured so that a through hole 41 of every channel is formed in an opaque plate such as, for example, a metal plate so that collimated input light of each channel passing through the microlens array 30 is not mixed together with the light of a separate channel.

Specifically, the second spacer 40 is configured to be arrayed in the same manner as the microlens 31 in the microlens array 30, and a plurality of through holes 41 is arrayed one-dimensionally or two-dimensionally in a direction orthogonal to the lamination direction.

An internal space of each through hole 41 functions as a light transmitting portion for transmitting light permeating through the microlens 31 of the corresponding channel to the lower layer. An inner wall of each through hole 41 enclosing the surrounding and defining the internal space functions as a non-transmitting portion for preventing light propagating through the internal space of the through hole 41 from propagating to an adjacent channel.

The second spacer 40 has a thickness that is equivalent to a focal length of the microlens 31. According to this thickness, for every channel, the light collimated by the corresponding microlens 31 propagates through the corresponding through hole 41 so as to focus on the surface of the optical branching plate 50.

The optical branching plate 50 is disposed under the second spacer 40 and adjacent to the second spacer 40. The optical branching plate 50 is configured having a tap film formed on, for example, the surface of a transparent plate.

The optical branching plate 50 branches, for every channel, collimated input light arriving from the corresponding microlens 31 through the corresponding through hole 41 at a predetermined ratio into reflected light as a first branched light propagating through the output optical fiber 11B of the same channel and transmitted light as a second branched light propagating to the lower layer. FIG. 2 illustrates a conceptual propagation path of input light and transmitted light before branching using a solid line arrow, and also illustrates a conceptual propagation path of reflected light using a dashed line arrow.

The third spacer 60 is disposed under the optical branching plate 50 and adjacent to the optical branching plate 50. The third spacer 60 is configured so that a through hole 61 of every channel is formed in an opaque plate such as, for example, a metal plate so that the transmitted light of each channel from the optical branching plate 50 is not mixed together with the light of a separate channel.

Specifically, the third spacer 60 is configured to be arrayed in the same manner as the through hole 41 in the second spacer 40, and a plurality of through holes 61 is arrayed one-dimensionally or two-dimensionally in a direction orthogonal to the lamination direction.

An internal space of each through hole 61 functions as a light transmitting portion for transmitting light permeating through the optical branching plate 50 from among input light of the corresponding channel to the lower layer. An inner wall of each through hole 61 enclosing the surrounding and defining the internal space functions as a non-transmitting portion for preventing light propagating through the internal space of the through hole 61 from propagating to an adjacent channel.

The aperture plate 70 is disposed under the third spacer 60 and adjacent to the third spacer 60. The aperture plate 70 is configured so that an aperture portion 71 of every channel is formed in an opaque plate such as, for example, a metal plate to suppress returning light from propagating to the lower layer.

The lid 80 is disposed under the aperture plate 70 and adjacent to the aperture plate 70, and it covers the PD ceramic package 90 of the lower layer. The lid 80 is constituted of a transparent plate. The light passing through each aperture portion 71 of the aperture plate 70 is propagated to the lower layer through the lid 80.

The PD ceramic package 90 is disposed under the lid 80 and adjacent to the lid 80. The PD ceramic package 90 is provided with a photodiode 91 for every channel. That is, the PD ceramic package 90 is a photodiode array and is configured similarly to the fiber array 10, wherein a plurality of photodiodes 91 is arrayed one-dimensionally or two-dimensionally.

The aperture portion 71 of each channel in the aperture plate 70 is formed so that returning light from the output optical fiber 11B of the corresponding channel is suppressed from propagating to the photodiode 91 of the same channel, and in turn, so that light arriving from the input optical fiber 11A of the corresponding channel through the through hole 61 is transmitted to the photodiode 91 of the same channel.

From among light propagating downstream of the optical communication network through the output optical fiber 11B, the returning light corresponds to light that is reflected downstream and flows back, and returns into the optical device 1 through the output optical fiber 11B.

That is, the aperture portion 71 of each channel is selectively provided in a path wherein input light from the input optical fiber 11A of the corresponding channel propagates, and it is formed so that the input light of the corresponding channel propagates to the photodiode 91 of the same channel. Thus, the aperture plate 70 is configured so as to block the returning light from propagating to the photodiode 91.

The photodiode 91 of each channel in the PD ceramic package 90 receives light from the input optical fiber 11A of a corresponding channel, which is propagated through the first spacer 20, the microlens array 30, the second spacer 40, the optical branching plate 50, the third spacer 60, the aperture plate 70, and the lid 80, and outputs an electrical signal according to the power of the received light as a measurement signal.

The light received by each photodiode 91 is, in detail, one portion of the input light from the input optical fiber 11A of the corresponding channel, which arrives through the through holes 21, 41, and 61 and the aperture portion 71, and from among the light collimated by the microlens 31 of the corresponding channel, it is light that permeates and propagates through the optical branching plate 50. The inner wall of the through holes 21, 41, and 61, which function as non-transmitting portions, suppresses input light of a channel other than the corresponding channel from arriving at each photodiode 91.

Figure 3:
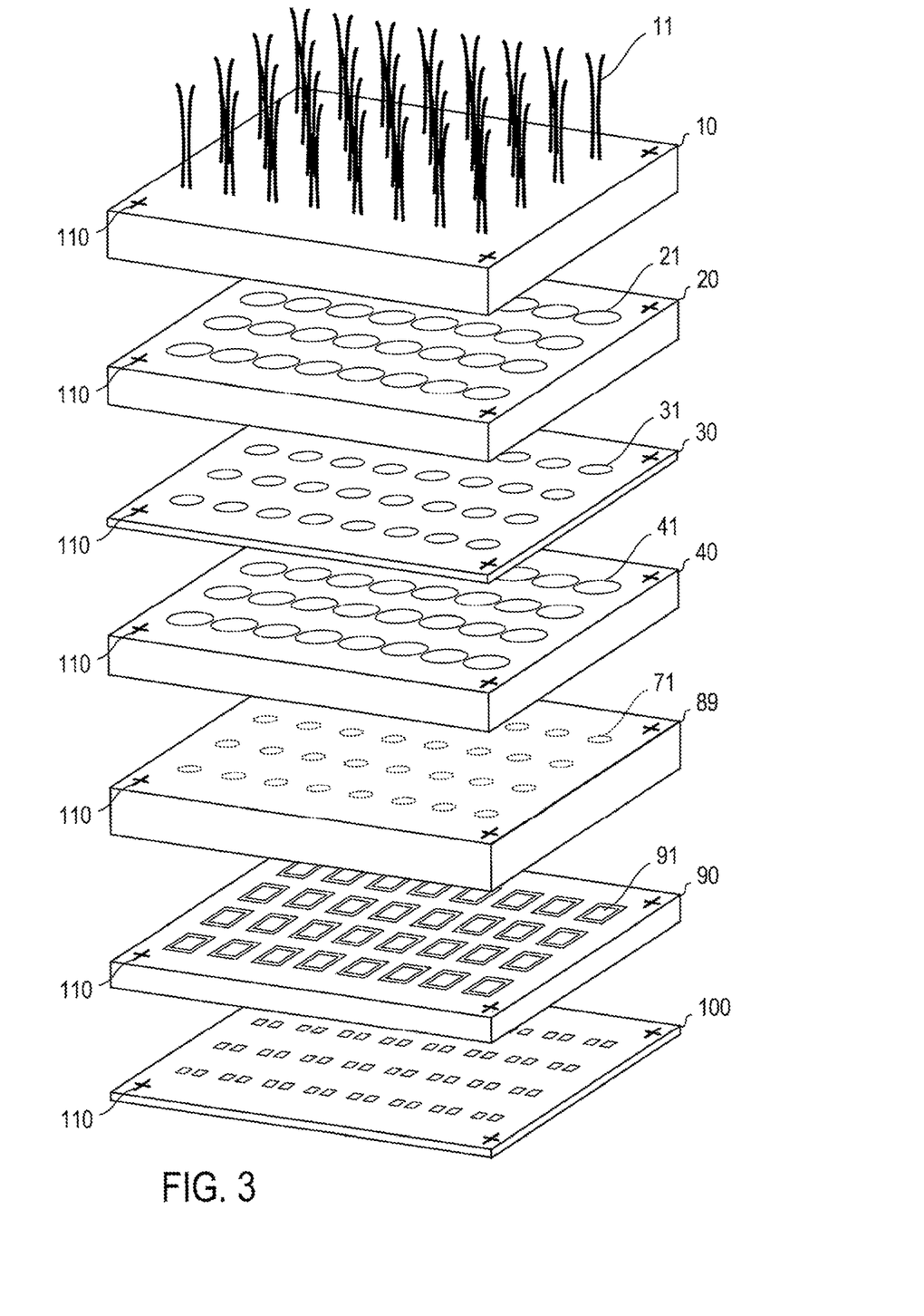
FIG. 3 is a schematic perspective view of the optical device, illustrating the optical device broken down into a group of components for lamination.

The optical device 1 configured in this manner is mounted on, for example, a printed wiring board 100 illustrated in FIG. 3. The measurement signal of each channel is input to the controller 5 via, for example, the printed wiring board 100. The controller 5 discerns the power of the input light of each channel based on the measurement signal of each channel. The controller 5 controls an optical communication device such as, for example, a ROADM based on the discerned power.

Furthermore, after a manufacturer has prepared in advance the fiber array 10, the first spacer 20, the microlens array 30, the second spacer 40, the optical branching plate 50, the third spacer 60, the aperture plate 70, the lid 80, and the PD ceramic package 90 as components for lamination, the optical device 1 may be manufactured by laminating and bonding these components for laminated using production machinery.

Prior to all lamination, one portion of the components for lamination may be integrally formed in advance as an integrated component, and the remaining components for lamination may be laminated together with the integrated component. A tap-including lid 89 illustrated in FIG. 3 is an integrated component wherein the optical branching plate 50, the third spacer 60, the aperture plate 70, and the lid 80 are integrally formed.

According to this example, the tap-including lid 89 is laminated together with the fiber array 10, the first spacer 20, the microlens array 30, the second spacer 40, and the PD ceramic package 90 to manufacture the optical device 1.

In other words, an alignment mark 110 illustrated in FIG. 3 may be provided on the components for lamination. The alignment mark 110 is provided for laminating and bonding each component for lamination while positioning the same at a correct relative position using an automatic alignment function of production machinery.

That is, the optical device 1 may be formed by the production machinery laminating the components for lamination including the prepared alignment mark 110 while positioning the components for lamination using the alignment mark 110 as a reference.

Thus, the optical device 1 is configured as a multi-channel optical power monitor wherein an optical element is accurately positioned without adjusting the position of the optical element, including a human aligning the input optical fiber 11A and the output optical fiber 11B by a human.

As illustrated in FIG. 3, the optical device 1 may laminated together with the printed wiring board 100 and used as is as a multi-channel power monitor. Meanwhile, the optical device 1 of one or more embodiments, as illustrated in FIG. 4, may be fragmented and processed into optical device chips 131, 133, and 135 having fewer channels than the optical device 1.

The optical device 1 of one or more embodiments, in a direction orthogonal to a lamination direction, may be provided with a separate area that does not overlap with another channel for every channel. The optical device 1 is configured so that the optical power monitor structure of each channel is within a projection region in the lamination direction of a corresponding area.

In other words, the optical device 1 is configured so that, for every channel, a constituent element group of the optical power monitor of a corresponding channel, including the fiber pair 11, through holes 21, 41, and 61, the microlens 31, the aperture portion 71, and the photodiode 91 of the corresponding channel, is lined up in the lamination direction in the area of the corresponding channel. The constituent element group of one channel is disposed so that all layers are within a projection region in the lamination direction of a corresponding area.

Figure 4:
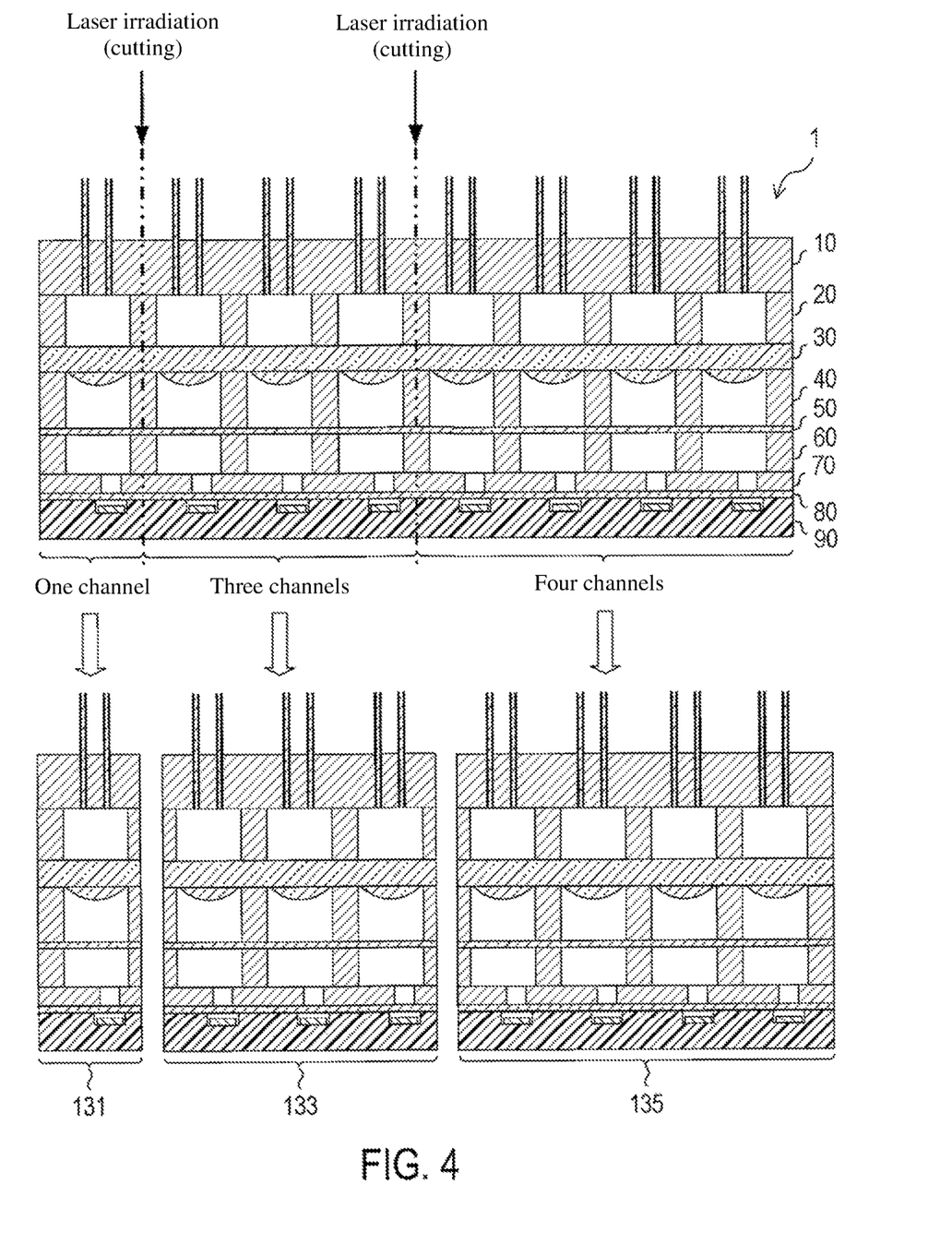
FIG. 4 is a descriptive diagram relating to a method of manufacturing an optical device chip.

According to this disposition, as illustrated in FIG. 4, cutting the optical device 1 in the lamination direction to fragment it makes it possible to manufacture the optical device chip 131, 133, and 135 as optical power monitors having fewer channels than the optical device 1.

Cutting may be performed using a femtosecond laser for reducing thermal effects and cutting margins. The femtosecond laser has an extremely short energy application time, and may process most of the materials used as the material of the optical device 1, such as quartz glass, sapphire, ceramics, and alumina, without thermal effects. The cutting margin is small in the range of submicron to several microns.

For example, the optical device 1 is configured as a multi-channel optical power monitor wherein the width of one channel, or in other words, the width of the foregoing area, is about one millimeter in a direction orthogonal to the lamination direction. The optical device 1 having such dimensions may be fragmented by the femtosecond laser, keeping the cutting margin within a range of less than one micron to several microns.

FIG. 4 describes that when the optical device 1 is provided with an optical power monitor structure for eight channels in a direction orthogonal to the lamination direction, the optical device 1 may be fragmented into the optical device chip 131 provided with an optical power monitor structure for one channel, an optical device chip 133 provided with an optical power monitor structure for three channels, and an optical device chip 135 provided with an optical power monitor structure for four channels by cutting the optical device 1 in the lamination direction.

Figure 5:
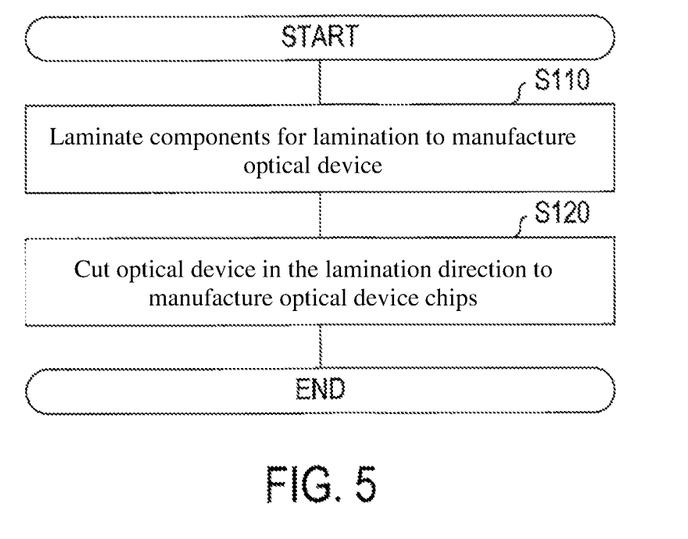
FIG. 5 is a flowchart relating to the method of manufacturing the optical device chip.

The manufacturer, as illustrated in FIG. 5, manufactures and prepares the optical device 1 (S110) and cut the optical device 1 in the lamination direction to fragment it (S120), which makes it possible to manufacture the optical device chips 131, 133, and 135 as optical power monitors having any number of channels.

When the elements of the optical device 1 are arrayed two-dimensionally, the optical device 1 is cut in the lamination direction so as to have a cut plane along a first direction orthogonal to the lamination direction, and furthermore, the optical device 1 is cut in the lamination direction so as to have a cut plane in a second direction orthogonal to the lamination direction and the first direction, and this makes it possible to manufacture an optical power monitor having any number of channels in the first direction and the second direction.

As another example, the optical device chips 131, 133, and 135 may be manufactured by a method wherein the plurality of components for lamination that configures the optical device 1 is prepared, these components for lamination are split into a plurality of groups and laminated separately, and at this stage, the laminated body of each group is fragmented, and thereafter, a fragment of the laminated body of each group is adhered in the lamination direction.

For example, a first laminated body may be manufactured by laminating from the lowest layer to any ith layer of the plurality of components for lamination that constitutes the optical device 1. Moreover, a second laminated body may be manufactured by laminating from the (i+1)th layer to the uppermost layer. Thereafter, the first and second laminated bodies are respectively fragmented, and a fragment of the first laminated body and a fragment of the second laminated body are adhered in the lamination direction, whereby optical device chips 131, 133, and 135 having the same structure as when the optical device 1 is cut in the lamination direction may be manufactured.

In relation to this manufacturing method, the manufacturer may manufacture the optical device chips 131, 133, and 135 by laminating the components for lamination of the optical device 1, excluding the fiber array 10, fragmenting the laminated body thereof, along with similarly fragmenting the fiber array 10 and adhering a fragment of the laminated body and a fragment of the fiber array 10 while aligning them.

According to the method of manufacturing the optical device 1 of one or more embodiments described above, a multi-channel optical power monitor is manufactured by laminating an array of optical power monitor constituent elements. Furthermore, prior to lamination, the alignment mark 110 is provided on the components for lamination, and the components for lamination are laminated using an automatic alignment function of production machinery to manufacture the optical device 1.

Therefore, according to one or more embodiments, alignment or the like of elements constituting the optical power monitor is not required for every channel, and alignment may be performed collectively for a plurality of channels to manufacture a highly accurate multi-channel optical power monitor.

Moreover, since the multi-channel optical power monitor is manufactured as an array, a small multi-channel optical power monitor may be manufactured when the multi-channel optical power monitor is constituted by bundling single channel optical power monitors.

According to one or more embodiments, furthermore, optical device chips 131, 133, and 135 having any number of channels may be mass-produced in response to a request from a customer by cutting the optical device 1 in the lamination direction.

Accordingly, the method of manufacturing the optical device 1 and the optical device chips 131, 133, and 135 of one or more embodiments makes it possible to improve the productivity of a single channel and a multi-channel optical power monitor.

Above, one or more exemplary embodiments of the present invention are described, but the present invention is not limited to the embodiments described above, and it goes without saying that various variations may be adopted. For example, when the influence of light mixing between the channels is small, the through holes 21, 41, and 61 need not be provided in the first spacer 20, the second spacer 40, and the third spacer 60.

The optical device 1 does not need to have a tap function. That is, the optical device 1 does not need to be provided with the output optical fiber 11B and the optical branching plate 50. For example, when an optical signal transmitting an optical transmission line upstream of the optical device 1 is branched for power measurement, the optical device 1 may use all the input light for power measurement without branching the input light internally. When a tap function is not provided in the optical device 1, the aperture plate 70 for suppressing the effect of returning light is also unnecessary.

In addition, the components for lamination in the optical device 1 need not have the alignment mark 110, and each component for lamination may be laminated while being positioned and fixed to the lower layer by a different method. All variations included in the technical concept identified from the wording described in the scope of patent claims are embodiments of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

1 . . . Optical device, 5 . . . controller, 10 . . . fiber array, 11 . . . fiber pair, 11A . . . input optical fiber, 11B . . . output optical fiber, 20 . . . first spacer, 21 . . . through hole, 30 . . . microlens array, 31 . . . microlens, 40 . . . second spacer 41 . . . through hole, 50 . . . optical branching plate, 60 . . . third spacer, 61 . . . through hole, 70 . . . aperture plate, 71 . . . aperture portion, 80 . . . lid, 89 . . . tap-including lid, 90 . . . PD ceramic package, 91 . . . photodiode, 100 . . . printed wiring board, 110 . . . alignment mark, 131, 133, 135 . . . optical device chip, Pi . . . input port, Po . . . output port.

What is claimed is:

1. An optical device, comprising:
a fiber array that has input optical fibers and output optical fibers, wherein the input optical fibers and the output optical fibers are grouped into an array of fiber pairs, such that each of the input optical fibers is paired with a corresponding output optical fiber, from among the output optical fibers;
a lens array that has lenses, wherein each of the lenses collimates input light from a corresponding input optical fiber, from among the input optical fibers;
a photodiode array that has photodiodes, wherein each of the photodiodes receives the input light collimated by a corresponding lens, from among the lenses, and outputs an electrical signal according to a power of the received input light;
a light branching layer, disposed between the lens array and the photodiode array, that branches the input light, from each of the input optical fibers, into a first branched light propagating toward the corresponding output optical fiber and a second branched light propagating toward a corresponding photodiode from among the photodiodes;
a first spacer, disposed between the fiber array and the lens array, that transmits the input light from each of the input optical fibers to the corresponding lens;
a second spacer, disposed between the lens array and the light branching layer, that transmits the input light passing through each of the lenses to the corresponding photodiode; and
a third spacer, disposed between the light branching layer and the photodiode array, that transmits the input light passing through light branching layer to the corresponding photodiode, wherein
the fiber array, the first spacer, the lens array, the second spacer, the light branching layer, the third spacer, and the photodiode array are laminated in this order.

2. The optical device according to claim 1, further comprising:
an aperture plate, having an aperture for each fiber pair, disposed between the third spacer and the photodiode array, wherein
the aperture:
suppresses returning light from the corresponding output optical fiber propagating to the corresponding photodiode, and
transmits the input light, from the corresponding input optical fiber, to the corresponding photodiode.

3. The optical device according to claim 1, wherein the first spacer comprises:
a through hole, for each input optical fiber, that transmits the input light from the corresponding input optical fiber to the corresponding lens; and
an inner wall around the through hole that suppresses the input light from the corresponding input optical fiber propagating to another lens other than the corresponding lens.

4. The optical device according to claim 1, wherein the second spacer comprises:
a through hole, for each lens, that transmits the input light permeating through the corresponding lens to the corresponding photodiode, and
an inner wall around the through hole that suppresses the input light permeating through the corresponding lens from propagating to another photodiode other than the corresponding photodiode.

5. The optical device according to claim 1, wherein
channels are one-dimensionally or two-dimensionally arrayed in a direction orthogonal to a lamination direction, and
each of the channels comprises one of the input optical fibers aligned, in the lamination direction, with the corresponding lens and the corresponding photodiode.

6. A method of manufacturing an optical device, the method comprising:
preparing a plurality of components for lamination, including the fiber array, the first spacer, the lens array, the second spacer, and the photodiode array constituting the optical device according to claim 1, wherein
at least a subset of the plurality of components for lamination are prepared with a mark for positioning, and
the plurality of components for lamination are laminated while positioning the mark as a reference.

7. A method of manufacturing an optical device chip, the method comprising:
preparing an optical device comprising:
a fiber array that has input optical fibers;
a lens array that has lenses, wherein each of the lenses collimates input light from a corresponding input optical fiber, from among the input optical fibers;
a photodiode array that has photodiodes, wherein each of the photodiodes receives the input light collimated by a corresponding lens, from among the lenses, and outputs an electrical signal according to a power of the received input light;
a first spacer, disposed between the fiber array and the lens array, that transmits the input light from each of the input optical fibers to the corresponding lens; and
a second spacer disposed between the lens array and the photodiode array, that transmits the input light passing through each of the lenses to a corresponding photodiode from among the photodiodes, wherein
the fiber array, the first spacer, the lens array, the second spacer, and the photodiode array are laminated,
channels are one-dimensionally or two-dimensionally arrayed in a direction orthogonal to a lamination direction, and
each of the channels comprises one of the input optical fibers aligned, in the lamination direction, with the corresponding lens and the corresponding photodiode; and
fragmenting, by cutting, the optical device in the lamination direction in order to manufacture an optical device chip having fewer channels than the optical device.

8. The method of manufacturing the optical device chip according to claim 7, wherein the cutting is performed using a femtosecond laser.

9. A method of manufacturing an optical device chip, the method comprising:
preparing a plurality of components for lamination, including a fiber array, a first spacer, a lens array, a second spacer, and a photodiode array constituting an optical device comprising:
the fiber array that has input optical fibers;
the lens array that has lenses, wherein each of the lenses collimates input light from a corresponding input optical fiber, from among the input optical fibers;
the photodiode array that has photodiodes, wherein each of the photodiodes receives the input light collimated by a corresponding lens, from among the lenses, and outputs an electrical signal according to a power of the received input light;

the first spacer, disposed between the fiber array and the lens array, that transmits the input light from each of the input optical fibers to the corresponding lens; and the second spacer disposed between the lens array and the photodiode array, that transmits the input light passing through each of the lenses to a corresponding photodiode from among the photodiodes, wherein the fiber array, the first spacer, the lens array, the second spacer, and the photodiode array are laminated, channels are one-dimensionally or two-dimensionally arrayed in a direction orthogonal to a lamination direction, and each of the channels comprises one of the input optical fibers aligned, in the lamination direction, with the corresponding lens and the corresponding photodiode;

laminating the plurality of components for lamination; and fragmenting, by cutting, the optical device in the lamination direction in order to manufacture an optical device chip that is a fragment of the optical device, wherein the optical device chip has fewer channels than the optical device.

\* \* \* \* \*